United States Patent [19]

Swan

[11] 3,722,033
[45] Mar. 27, 1973

[54] FOWL DRESSING TOOL

[76] Inventor: Neil O. Swan, Route 1, St. Cloud, Minn. 56301

[22] Filed: Sept. 27, 1971

[21] Appl. No.: 184,086

[52] U.S. Cl. ............................17/11, 30/286, 30/276
[51] Int. Cl. .................................................A22b 3/08
[58] Field of Search ......17/11, 23; 30/276, 286, 278, 30/282

[56] References Cited

UNITED STATES PATENTS

| | | | |
|---|---|---|---|
| 3,518,718 | 7/1970 | Barefield | 17/11 X |
| 1,928,718 | 10/1933 | Covey | 30/276 |
| 3,526,018 | 9/1970 | Lovitt | 17/11 |

*Primary Examiner*—Louis G. Mancene
*Assistant Examiner*—D. L. Weinhold
*Attorney*—Everett J. Schroeder et al.

[57] ABSTRACT

This invention relates to a tool for removing oil glands or sacs from fowl carcasses and incorporates a pneumatic rotary motor with a cutter and guard section thereon designed to locate the cutter blade in an area where the severing operation can be effected with a minimum of carcass loss and in a minimum of time. The guard structure includes a guard to expose only a portion of the blade for safety purposes and guides at the area exposed to insure accurate location of the blade in the severing operation.

9 Claims, 6 Drawing Figures

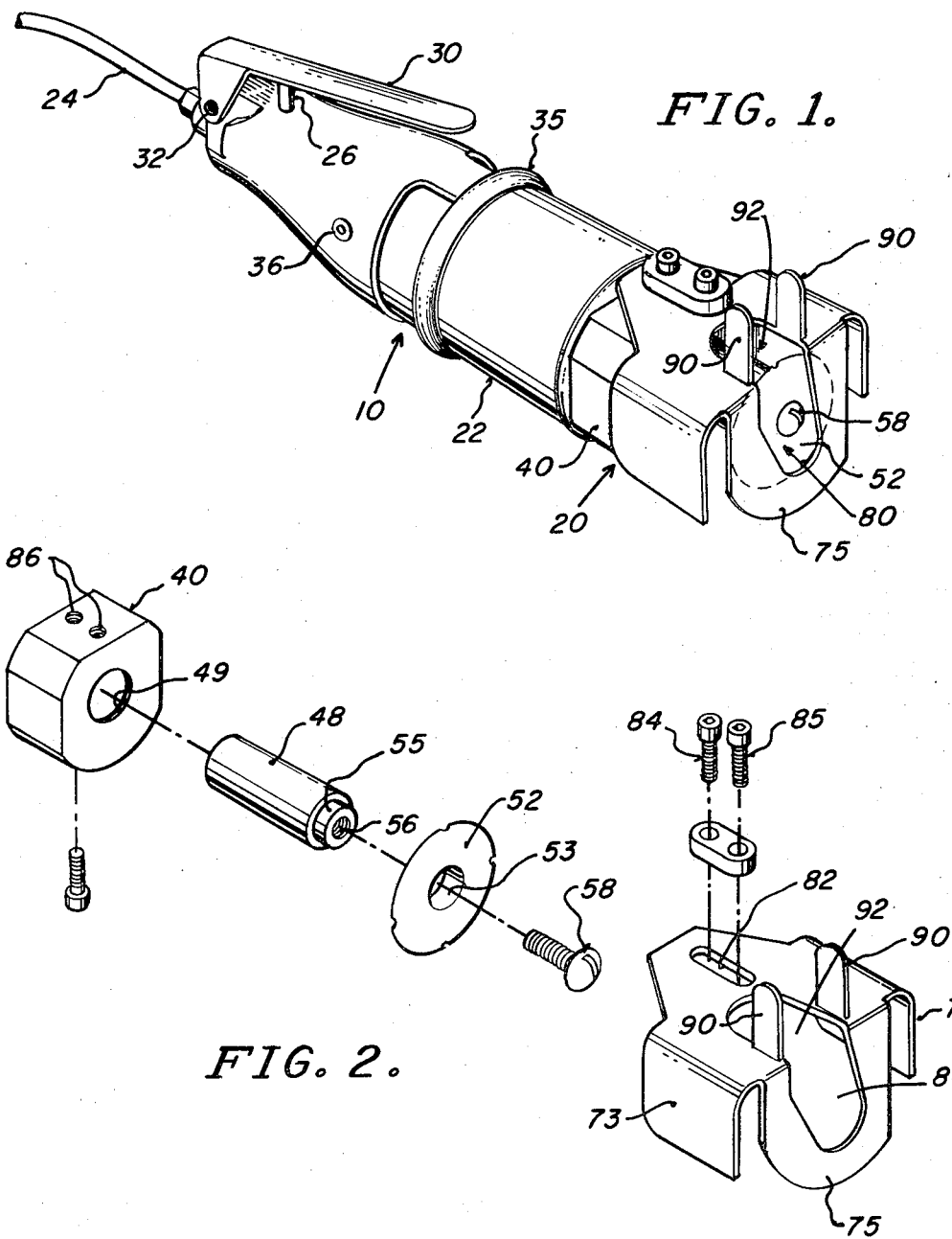

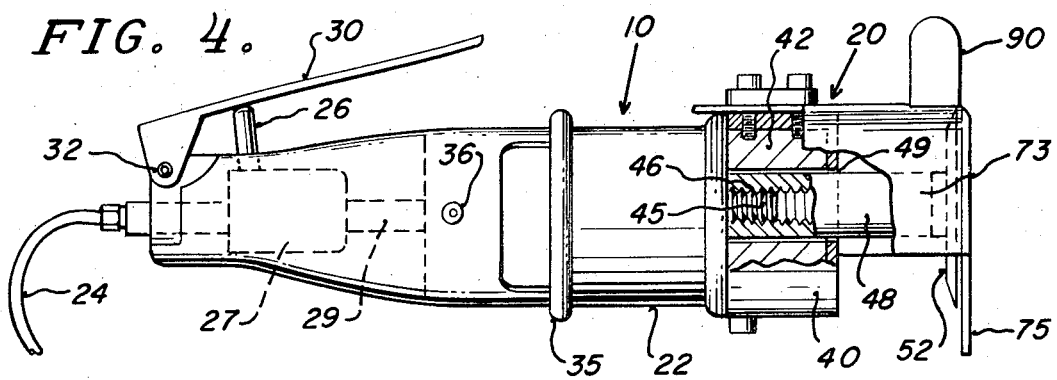
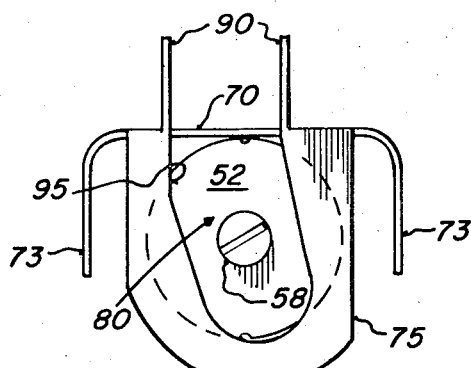
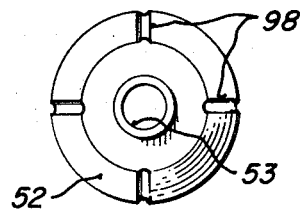
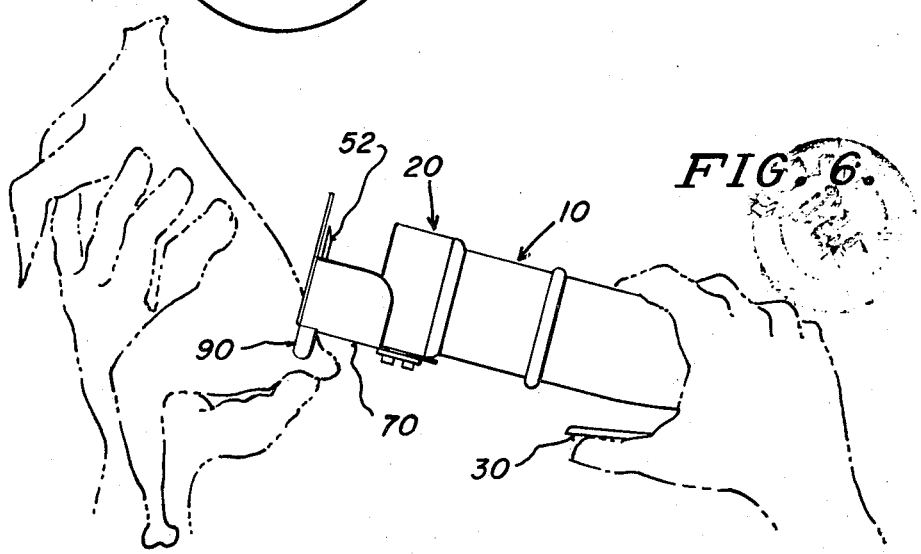
INVENTOR.
Neil O. Swan

FOWL DRESSING TOOL

My invention relates to a poultry processing tool and more particularly to an improved tool for removing the oil sac or gland from fowl carcass.

The removal of inedible parts on a poultry carcass is significant in improving the quality and market value of the carcass. This is particularly true in the case of oil glands or the oil sac in a poultry. The removal of the same, however, has heretofore required a manual operation with knives leading to significant losses in terms of the meat on the carcass and hence the market value of the same. In certain instances, poultry processing machinery have been utilized which are generally complex and while satisfactory to automate gland and other part removals from carcasses, normally remove significant portions of the same to result in carcass loss and further requiring significant expenditures in terms of tools for doing the same.

The present invention is directed to an improved portable gland cutting tool particularly adapted for use with poultry, such as chicken carcasses. As such it is particularly adapted for removing of the oil sac positioned above the rump of the chicken on the carcass and for accurately positioning the cutting surface so that a minimum amount of carcass meat will be severed with the removal of the oil sac. It incorporates a rotary fluid motor which forms the handle for the tool and a disc type cutting surface with a guide structure attached thereto which exposes only a portion of the cutting blade for safety purposes and guide surfaces along the exposed portion to accurately guide the tool into location beside the oil sac to sever the same.

It is therefore the principal object of this invention to provide an improved portable gland cutting tool for poultry.

Another object of this invention is to provide in a tool of this type a guard structure thereon that isolates the cutting surface except in the area where cutting is to be performed and with guide structures along the same to prevent injury to the operator.

A further object of this invention is to provide in a tool of this type an improved guard and guide structure which accurately locates the tool with respect to poultry carcass for accurately removing the oil glands from the poultry carcass.

A still further object of this invention is to provide a tool of this type which is relatively low in cost and easy to use and maintain.

These and other objects of this invention will become apparent from the reading of the attached description together with the drawings wherein:

FIG. 1 is a perspective view of the improved fowl dressing tool;

FIG. 2 is an exploded view of the cutter portion of the fowl dressing tool of FIG. 1;

FIG. 3 is a bottom view of the fowl dressing tool of FIG. 1 showing the guard for the same;

FIG. 4 is a side elevation view of the fowl dressing tool of FIG. 1;

FIG. 5 is a sectional view of the fowl dressing tool taken along the lines 5—5 in FIG. 4; and FIG. 6 is a schematic view of the fowl dressing tool showing its location in the dressing of poultry.

My improved tool is shown in FIG. 1 as incorporating a handle motor section 10 and a cutter section 20, the sections being connected together to form a portable tool particularly adapted for the removal of oil glands or sacs from poultry carcasses. The tool incorporates a rotary fluid motor 22, preferably pneumatic, which is adapted to be energized from a power source or air line, indicated at 24, to provide a simplified pneumatic tool which is safe for hand operations under environmental conditions involving moisture. The handle section includes a conically shaped housing 25, preferably of metal which mounts a control valve included therein and operated by a plunger 26 slidably mounted in the housing and cooperating with a handle member 30 pivotally mounted at one extremity on the housing as at 32 with the handle extending outside of the housing and engaging the plunger 26 of the internal valve 24 to operate the same. The valve is connected to the fluid or pneumatic line 24 to control flow therethrough and to the inlet of the motor positioned at the extremity of the same within the housing. The housing is mounted on the motor by means of a clamp member 35 which clamps the cylindrical housing of the motor to the conically shaped housing 25 with suitable screw means 36 being threaded through the housing and clamping one end of the motor to secure the same thereto. The pneumatic motor may take varying forms and will have the conventional exhaust vents through the sides at the housing with an output shaft at the extremity opposite the inlet and remote from the housing 25 which forms with the body of the motor, the handle portion of the tool. The control valve 27 shown in phantom in FIG. 4 may similarly take varying forms and is operated by depression of the plunger 26 to open a flow passage through the valve and to the inlet of the motor, indicated in phantom at 29. I have found that a pneumatic actuator incorporating the housing motor, control valve and handle and manufactured by Ingersoll-Rand, 11 Broadway, New York City, N.Y. 10004 under type No. 000B is suitable for this purpose.

The cutter section 20 will best be seen in the exploded view of FIG. 2 and the side elevational view of FIG. 4. It includes an adaptor member 40 for mounting the cutter section on the shaft extension portion of the motor and in particular on the shaft journaling flange 42 thereof. Attached to the output shaft 45 of the motor which has a threaded extremity as at 46 is the shaft extension member 48 which threads therein and extends out of an aperture 49 in the adaptor member 40. The shaft extension includes a shoulder or recessed portion 50 upon which is mounted the cutter blade 52, the latter being generally in the form of a truncated cone with a mounting aperture 53 therethrough which fits over the recessed portion 50 of the shaft extension to permit the cutter blade to be secured thereto by a screw 55 which threads into an internal tapped portion 56 of the shaft extension to secure the cutter blade thereon. The adaptor is secured to the journal section 42 of the motor housing by means of a screw 60 which threads through a tapped aperture in the adaptor housing. Also mounted on the adaptor is a guard structure 70 which is a generally plate-like member having a pair of side flanges 73 which when formed are bent around the sides of the adaptor and extend around the sides of the shaft extension and cutter to substantially enclose the same on three sides thereof. The adaptor includes a transversely extending flange section 75 which when bent normal to the extent of the adaptor is positioned below the cutter blade 52 or adjacent the same enclosing the same on the bottom side. The adaptor includes an elongated slot 80 which extends through the main body section of the guard in the area of the side flanges 73 and is offset from the geometrical center of the same and extends to the extent of the transversely extending flange portion 75 to be aligned with the geometric center of the flange portion and with the geometric center of the cutter blade. This will give a pair of sides to the slots which are positioned at an angle to the extent of the shaft and the geometric center of the flange or guard structure 70. The latter is mounted on the adaptor by means of a slot 82 positioned near one edge of the same and aligned with the geometrical center of the flange, the slot mounting a pair of screw members 84, 85 which thread into tapped apertures 86 in the adaptor and permit an adjustment of the guard relative to the adaptor to accurately position the same.

The aperture 80 in the guard member 70 defines a slot in the first or main portion of the guard member which is positioned axially of the shaft or parallel thereto to define an opening (see FIG. 1) exposing a portion of the cutter blade 52 for cutting purposes. Positioned along the sides of the aperture at this portion are guide flange members 90 which are suitably attached thereto, such as by welding, and project away from the shaft and parallel to the sides of the slot or aperture. These guide flanges have curved or rounded extremities as at 92 and define the opening wherein cutting is to take place. As will be seen in FIGS. 1 and 3 the cutter blade is located with respect to the transversely extending guard portion 75 such that the curvature of the slot 80 in this area is concentric with the axis of the cutter and the shaft. The sides of the slot, because of the offset in the ends of the same, define an irregular opening which is exposed on one side more than the other to provide an additional cutting surface as that at 95 with rotation of the cutter to eliminate that portion of the carcass severed by the cutting blade. The flange portion 75 will cover the exposed edges of the cutting blade except for that exposed by the slot 80 to protect the user against the exposed cutting surfaces except in the area in which cutting is to take place. Similarly, the side flanges 73 provide an enclosure for the major portion of the cutting blade together with the flange section 75 to enclose the same. The cutting blade, as will be seen in the sectional view of FIG. 5 has a peripheral cutting surface with a plurality of notches or slots 98 positioned around the extent of the same to aid in the severing operation.

This improved portable fowl dressing tool is particularly adapted for use in connection with the severing of the oil gland or sac positioned on the upper side of the rump of a fowl carcass, such as in chickens. The latter will project upward in this area and the improved cutting tool, as will be seen schematically in FIG. 6, will be brought into proximity with the rump of the carcass with the exposed or recessed surface of the guard structure facing the rump portion and with the guide flanges 90 positioned on either side of the oil gland. The operator will grip the carcass by the thigh and place the thumb underneath the tail or rump with a slight pressure against the tail. The cutter guides will be positioned on the sides of the gland and the cutter blade with slight pressure applied to the handle and with operation of the control valve to rotate the cutter blade will sever the oil gland removing a minimum amount of flesh from the carcass. Slight pressure against the tail will raise the oil gland to an area where it may be readily severed and removed through a cut passing under the gland past the gland valve and being lifted out as the tool is raised as it approached the tail or rump section of the carcass. This improved portable oil gland severing tool eliminates the need for hand operation with special knives which resulted in a time consuming operation and the significant loss in carcass weight in the removal of the oil gland or sac. With the removal of the gland only, through my improved oil gland or dressing tool, a minimum of carcass loss will be sustained and the resulting carcass will be of higher quality. The improved tool significantly reduces the time required for the oil gland severing operation and provides a simplified tool that can be safely used by an operator without injury.

Therefore, in considering this invention it should be remembered that the present disclosure is illustrative only and the scope of the invention should be determined by the appended claims.

What is claimed is:

1. A portable gland cutting tool for poultry comprising, a motor section and a cutter section connected together, said motor section including a rotary motor means having a power input connection at one end of the same and an output shaft means at the other end of the same and forming in part the handle means for the tool, control means mounted on one end of the motor section and having a control handle connected thereto extending adjacent the extent of the motor section for operating the same, said control means being connected to the power input connection of the rotary motor to control power input thereto, circular cutter means included in the cutter section and having a peripheral cutting surface, said cutter means being mounted concentrically with the shaft means of the rotary motor to be driven thereby, and a guard structure included in the cutter section and having a portion connected to the motor section and extending axially therefrom to substantially surround the shaft means and the cutter means connected thereto, said guard structure including a second portion extending normal to the extent of the first portion and remote from the connection to the motor section being positioned around the peripheral surface of the cutter means with aperture means included therein and in part in the first named portion to expose a portion of the cutter means.

2. The portable gland cutting tool of claim 1 in which the rotary motor means is a pneumatic motor and the control means is a control valve for controlling the flow of air from a pneumatic source to the motor.

3. The portable gland cutting tool of claim 1 and including guide means extending from the guard structure on either side of the aperture in the first named portion of the guard structure and away from the second named portion.

4. The portable gland cutting tool of claim 1 in which the cutter means is a disc having the shape of a truncated cone with the base of the cone having the peripheral cutting surface thereon and located remote from the rotary motor.

5. The portable gland cutting tool of claim 1 and including a journal member included in the cutter section and connected to the rotary motor for journaling the output shaft and including means for mounting the guard structure of the cutter section thereon.

6. The portable gland cutting tool of claim 3 in which the guide means include a pair of guide flanges extending parallel to one another at the edge of the aperture in the first named portion of the guard structure and normal to the extent of the second named portion and the base of the cutter means.

7. The portable gland cutting tool of claim 6 in which the guide flanges have curved outer peripheral surfaces with one edge of the same being flush with the extent of the second named portion of the guard structure.

8. The portable gland cutting tool of claim 3 in which the first named portion of the guard structure is generally curved to substantially surround the shaft means and the second named portion is flat and generally U shaped in form with the guide flanges extending from the open end of the U shape.

9. The portable gland cutting tool of claim 8 in which the second portion of the guard structure which is generally U shaped in form defined by the aperture therein with one inner side of the U shape generally parallel with the guide flanges of the guide means and one at an angle thereto to provide an additional cutting surface with the circular cutter means.

* * * * *